United States Patent [19]

Shimizu et al.

[11] Patent Number: 4,935,923

[45] Date of Patent: Jun. 19, 1990

[54] SIMPLE ADAPTER FOR MULTIPLEXING ISDN TERMINALS

[75] Inventors: Tomoyoshi Shimizu; Hiroshi Ikeda; Hatsuho Murata, all of Tokyo, Japan

[73] Assignee: NEC Corporation, Japan

[21] Appl. No.: 283,728

[22] Filed: Dec. 13, 1988

[30] Foreign Application Priority Data

Dec. 14, 1987 [JP] Japan ............................... 62-316571
Dec. 14, 1987 [JP] Japan ............................... 62-316572

[51] Int. Cl.⁵ ..................... H04Q 11/04; H04J 3/16; H04J 3/12
[52] U.S. Cl. .................................... 370/60; 370/110.1
[58] Field of Search ............... 370/60, 94, 110.1, 58, 370/85, 86, 88, 58.1, 58.2, 60.1

[56] References Cited

U.S. PATENT DOCUMENTS

| | | | |
|---|---|---|---|
| H586 | 2/1989 | Kun ........................................ | 370/94 |
| 4,722,082 | 1/1988 | Furuya et al. ..................... | 370/110.1 |
| 4,736,364 | 4/1988 | Basso et al. ....................... | 370/110.1 |
| 4,821,264 | 4/1989 | Kim ....................................... | 370/94 |
| 4,821,265 | 4/1989 | Albal et al. ........................ | 370/110.1 |

Primary Examiner—Douglas W. Olms
Assistant Examiner—Wellington Chin
Attorney, Agent, or Firm—Laff, Whitesel, Conte & Saret

[57] ABSTRACT

A simple adapter for multiplexing ISDN (Integrated Services Digital Network) terminals adapter for an ISDN basic subscriber access system is connected by a connector to a subscriber's point-to-multipoint bus. The adapter allows a greater number of terminal equipment (TE) to be connected to the point-to-multipoint bus via S/T interfaces. By checking the type, subaddress or the like of a call coming in through the adapter, the adapter is capable of limiting the kind of acceptable calls.

2 Claims, 3 Drawing Sheets

SIMPLE ADAPTER FOR MULTIPLEXING ISDN TERMINALS

BACKGROUND OF THE INVENTION

The present invention relates to a basic subscriber access system for an ISDN (Integrated Services Digital Network) and, more particularly, to a simple adapter for multiplexing ISDN terminal equipment.

Wiring arrangements for an ISDN basic subscriber access system of the kind described are taught in CCITT RED BOOK VOLUME III-FASCICLE III.5 "INTEGRATED SERVICES DIGITAL NETWORK (ISDN)", Recommendation (Rec.) I.430 ("BASIC USER-NETWORK INTERFACE-LAYER 1 SPECIFICATION"), ANNEX A ("Wiring configurations and round trip delay considerations used as a basis for electrical characteristics"). Specifically, as shown in Rec. I.430, FIG. A-1/I.430., there is available a point-to-point configuration in which a terminal equipment (TE) constituting a single transmitting section and a network termination (NT) constituting a single receiving section are located at opposite ends of a single cable. Also available is a point-to-multipoint configuration which uses a short passive bus for allowing a maximum number of eight TEs to be connected to any desired points of a single cable, as shown in Rec. I.430, FIG. A-2/I.430. Another point-to-multipoint configuration is shown in Rec. I.430, FIG. A-3/I.430 which uses an extended passive bus, i.e., a passive bus is extended with points of connection of TEs to a cable being collectively located at the end which is remote from an NT.

A problem with the prior art ISDN basic subscriber access system is that, whatever its configuration may be, the number of TEs which can be identified is limited despite that theoretically a maximum number of 127 TEs are identifiable, because electrical characteristics have to be guaranteed. In this connection, in CCITT Rec. I.430, the point-to-multipoint configuration using a passive bus accommodates only eight TEs at maximum (see ANNEX A, "A.2.1.2"). Another problem is brought about when a call is received without any terminal being designated in the ISDN basic subscriber access system, i.e. reception on Global Address basis. Specifically, the Global Addressing allows all of the terminals which may respond to actually respond and, therefore, makes it impossible for a subscriber to limit the reception range beforehand in association with the connectors of S/T interfces. This undesirably causes a call to be received at all connector terminals (corresponding to CCITT Rec. I.430, point S) uniformly.

SUMMARY OF THE INVENTION

It is therefore an object of the present invention to provide an ISDN terminal simple multiplexing adapter for an ISDN basic subscriber access system which noticeably increases the number of TEs which may be connected.

It is another object of the present invention to provide an ISDN terminal simple multiplexing adapter for ISDN basic subscriber access system having a capability for limiting the reception of a call.

In accordance with the present invention, an ISDN (Integrated Services Digital Network) terminal simple multiplexing adapter for an ISDN basic subscriber acceess system comprises a network termination (NT)-side layer 1 terminal circuit connected to an NT via an S interface bus, a plurality of ISDN terminal equipment (TE)-side layer 1 terminal circuits for terminating a plurality of S interface buses to which ISDN TEs are connected, a layer 1 activation control circuit for delivering an activation command to all of the NT-side layer 1 terminal circuit and TE-side layer 1 terminal circuits in response to S interface bus activation information which may be fed from the NT-side layer 1 terminal circuit and TE-side layer 1 terminal circuits, an NT-side D-channel signal transfer control circuit for buffering and controlling transmission and reception of a D-channel signal which is separated by the NT-side layer 1 terminal circuit, a conflict control circuit for controlling conflicts of data which may be transferred from the TE-side D-channel signal transfer control circuits to the NT-side D-channel signal transfer control circuit, data transfer means for transferring data from the NT-side D-channel signal transfer control circuit to the TE-side D-channel signal transfer control circuits by a broadcast mode, a B-channel switching circuit for selectively connecting B channels of the NT-side layer 1 terminal circuit and B channels of the TE-side layer 1 terminal circuits, a monitoring circuit for monitoring the D-channel signal which is separated by the NT-side layer 1 terminal circuit, and a B-channel switching control circuit for controlling the B-channel switching circuit in response to a call control signal which is sensed by the monitoring circuit.

Further, in accordance with the present invention, an ISDN terminal simple multiplexing adapter for an ISDN basic subscriber access system comprises an NT-side layer 1 terminal circuit connected to an NT via an S interface bus, a plurality of IDN TE-side layer 1 terminal circuits for terminating a plurality of S interface buses to which ISDN TEs are connected, a layer 1 activation control circuit for delivering an activation command to all of the NT-side layer 1 terminal circuit and TE-side layer 1 terminal circuits in response to S interface bus activation information which may be fed from the NT-side layer 1 terminal circuit and TE-side layer 1 terminal circuits, an NT-side D-channel signal transfer control circuit for buffering and controlling transmission and reception of a D-channel signal which is separated by the NT-side layer 1 terminal circuit, a conflict control circuit for controllig conflicts of data which may be transferred from the TE-side D-channel signal transfer control circuits to the NT-side D-channel signal transfer control circuit, data transfer means for transferring data from the NT-side D-channel signal transfer control circuit to the TE-side D-channel signal transfer control circuits in a broadcast mode, a reception control circuit for designating particular one of the TE-side S interface buses in response to a call received from a network, and data setting means for setting data in the reception control circuit, data transfer means for identifying, among data transferred from the NT-side D-channel signal transfer control circuit to the TE-side D-channel signal transfer control circuits, a SETUP message from the network and transferring data only to any of the TE-side D-channel signal transfer control circuits which is allowed by the reception control circuit, a B-channel switching circuit for selectively connecting B-channels of the NT-side layer 1 terminal circuit and B-channels of the TE-side layer 1 terminal circuits, a monitoring circuit for monitoring the D-channel signal which is separated by the NT-side layer 1 terminal circuit, and a B-channel switching control circuit for controlling the B-channel switching circuit in response to a call control signal which is sensed by the monitoring circuit.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1A:
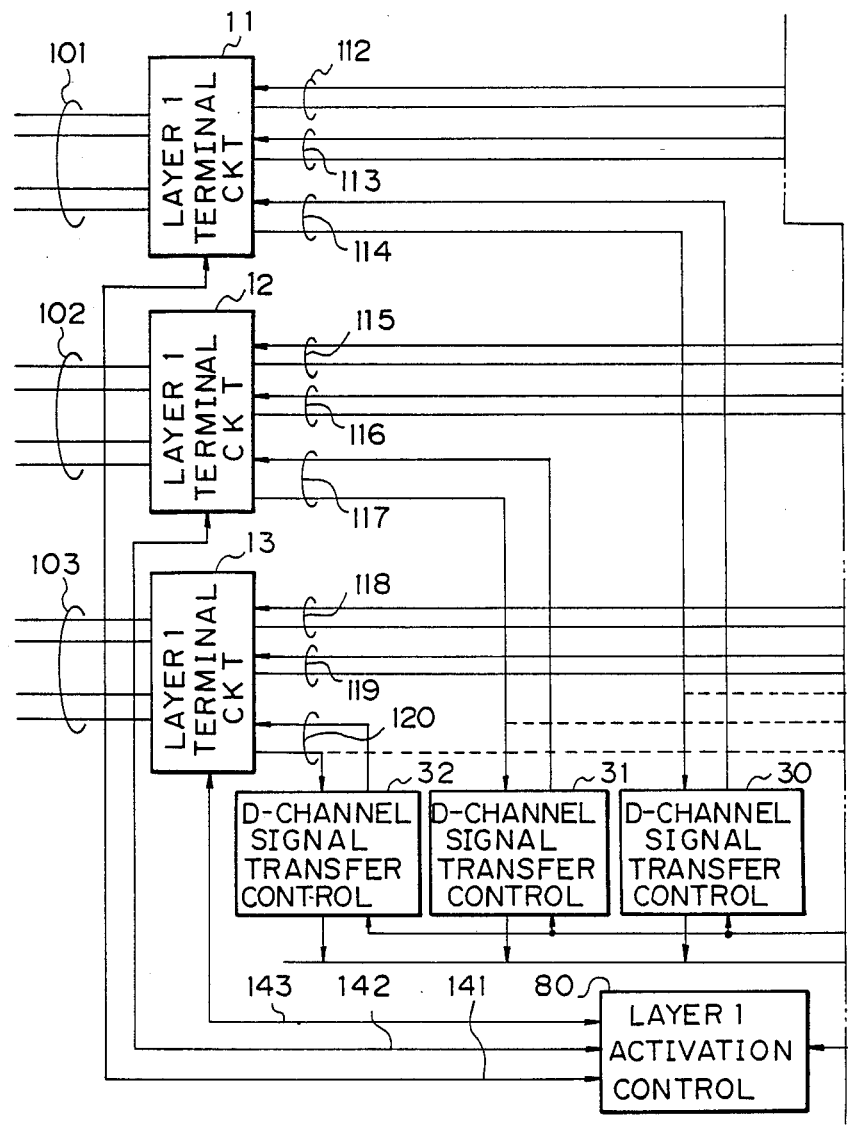
FIG. 1A and 1B is are a schematic block diagram showing an ISDN terminal simple multiplexing adapter embodying the present invention.
Figure 1B:
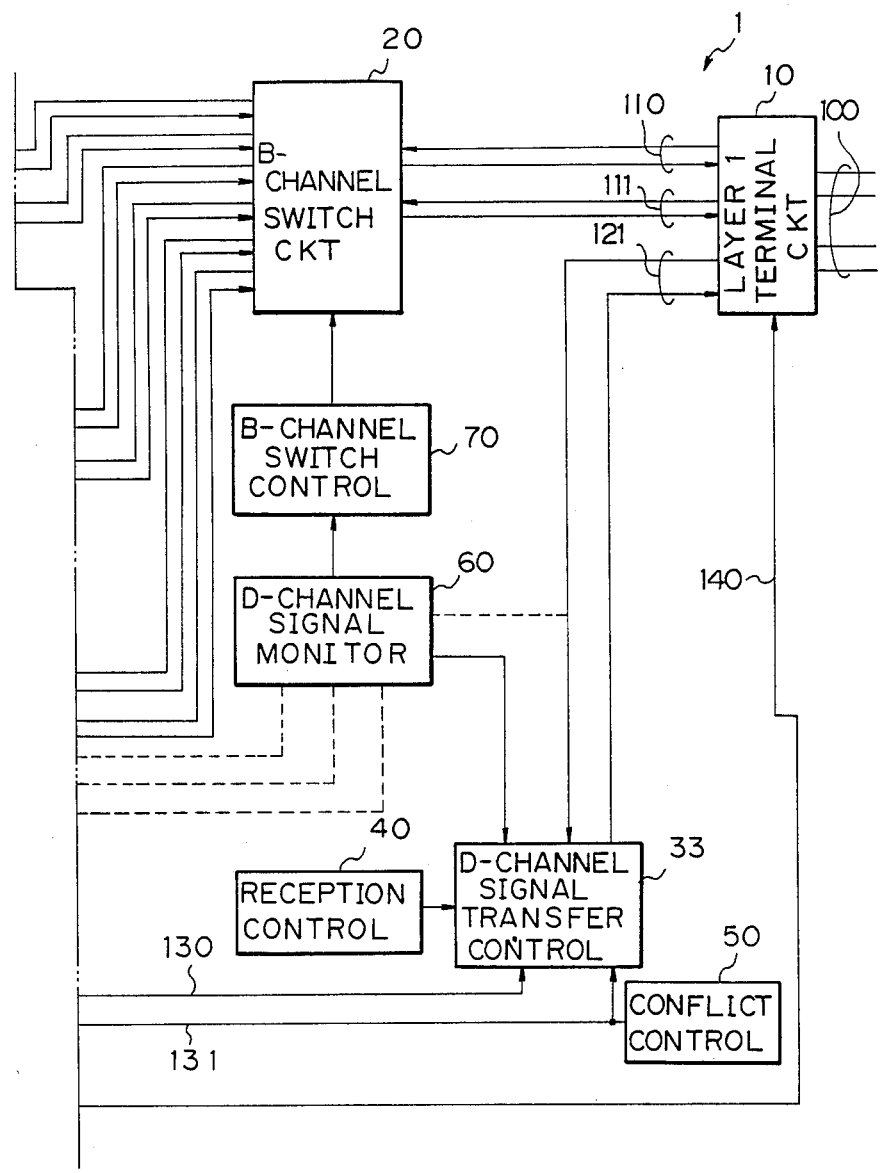

Referring to FIG. 1 of the drawings, a simple adapter for multiplexing ISDN terminals embodying the present invention is shown and generally designated by the reference numeral 1. As shown, the adapter 1 includes a layer 1 terminal circuit 10 connected to an S/T interface (bus) 100, a layer 1 terminal circuit 11 connected to an S/T interface (bus) 101, a layer 1 terminal circuit 12 connected to an S/T interface (bus) 102, and a layer 1 terminal circuit 13 connected to an S/T interface (bus) 103. A B-channel switching circuit 20 is connected to the layer 1 terminal circuit 10 by a B1 channel 110 and a B2 channel 111, to the layer 1 terminal circuit 111 by a B1 channel 112, a B2 channel 113 and a D channel 114, to the layer 1 terminal circuit 12 by a B1 channel 115, a B2 channel 116 and a D channel 117, and to the layer 1 terminal circuit 13 by a B1 channel 118, a B2 channel 119 and a D channel 120. A D-channel signal transfer control circuit 30 is connected to the layer 1 termination circuit 11 by the D channel 114. A D-channel signal transfer control circuit 31 is connected to the layer 1 terminal circuit 12 by the D channel 117. A D-channel signal transfer control circuit 32 is connected to the layer 1 terminal circuit 13 by the D channel 120. A D-channel signal transfer control circuit 33 is connected to the D-channel signal transfer control circuits 30 to 32 by D-channel signal buses 130 and 131 and to the layer 1 terminal circuit 10 by a D channel 121. A reception control circuit 40 is connected to the D-channel signal transfer control circuit 33. A conflict control circuit 50 is connected to the D-channel signal transport control circuit 33 by the D channel 131. A D-channel signal monitoring circuit 60 is connected to the D-channel signal transport control circuit 33. A B-channel switching control circuit 70 is connected between the D-channel signal monitoring circuit 60 and the B-channel switching circuit 20. Further, a layer 1 activation control circuit 80 is connected to the layer 1 terminal circuits 10 to 13. Interchanged between the layer 1 terminal circuits 10, 11, 12 and 13 and the layer 1 activation circuit 80 are layer 1 control signals 140, 141, 142 and 143, respectively.

Figure 2:
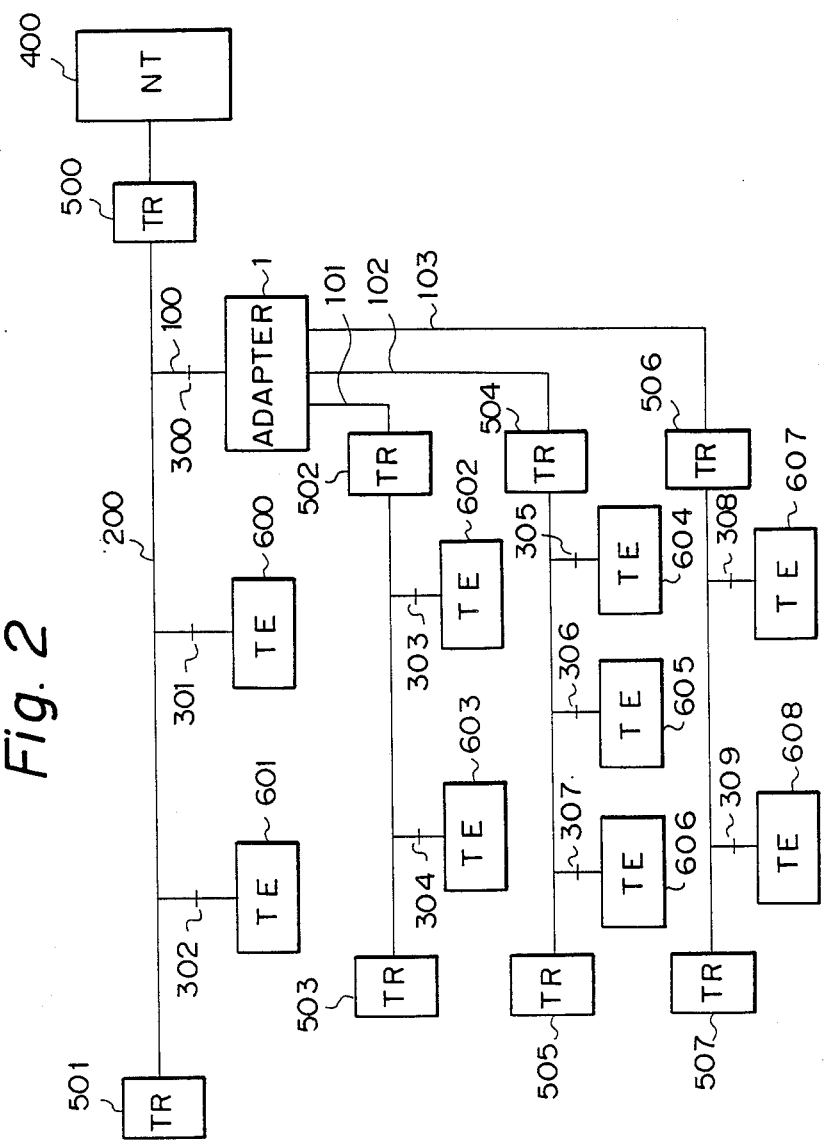
FIG. 2 is a block diagram schematically showing how the adapter shown in FIG. 1 is connected in an ISDN basic subscriber access system.

FIG. 2 shows a specific wiring arrangement wherein the adapter 1 constructed as shown in FIG. 1 is connected to a connector 300 which is included in a subscriber's point-to-multipoint bus 200 and corresponds to the point S as defined in CCITT Rec. I.430. In the figure, the reference numerals 301' to 309 designate connectors, the reference numerals 201 to 203 designate point-to-multipoint buses, the reference numeral 400 designates an NE, the reference numerals 500 to 507 designate TRs (Terminal Resisters), and the reference numerals 600 to 608 designate TEs.

The operation of the adapter 1 which is connected as shown in FIG. 2 will be described in detail.

A signal received from the NT over the bus 100 and connector 300 is terminated by the layer 1 terminal circuit 10 and divided into two B channels 110 and 111 and one D channel 121 to reach the B-channel switching circuit 20 and the D-channel signal transfer control circuit 33. The B channels 110 and 111 each has a signalling rate of 64 kilobits per second while the D channel 121 has a signalling rate of 16 kilobits per second. The signal propagating along the D channel 121 has a frame format which is prescribed by CCITT Rec. I.440(Q.920) and I.441(Q.921). The signal on the D channel 121 is fed to the TE-side D-channel signal transfer control circuits 30 to 32 by the D-channel signal transfer control circuit 33 and further to the TE-side Layer 1 terminal circuits 11 to 12. The layer 1 terminal circuit 11 multiplexes the signals coming in from the B-channel switching circuit 20 over the two B channels 112 and 113 (64 kilobits per second) and the signal coming in from the D-channel signal transfer control circuit 30 over the D channel 114 (16 kilobits per second), according to CCITT Rec. I.430 (FIG. 3/I.430). The resulting multiplexed signal is fed to the TE-side extended bus 101. Likewise, the layer 1 terminal circuit 12 multiplexes signals coming in over the two B channels 115 and 116 and a signal coming on over the D channel 117 and delivers the resulting multiplexed signal to the extended bus 102. Further, the layer 1 terminal circuit 13 multiplexes signals coming on over the two B channels 118 and 119 and a signal coming in over the D channel 115, the resulting signal being fed to the extended bus 103. Consequently, the frame signal on the D channel received from the NT is sent out to all of the extended buses 101 to 103 in a broadcast mode. The connectors 303 to 309 each being provided on a respective one of the extended buses 101 to 103 as shown in FIG. 2 plays the role of the point S as defined in CCITT Rec. I.411 and operates in the manner prescribed by CCITT Rec. I.430.

On the other hand, signals coming in over the extended buses 101 and 103 on the TE side are terminated by their associated layer 1 terminal circuits 11, 12 and 13. Frame signals on the respective D channels 114, 117 and 120 separated by the layer 1 terminal circuits 11, 12 and 13 are delivered to the NT side via the D-channel signal transfer control circuits 30, 31 and 32, respectively. Since the frame signals on the D channels 114, 117 and 120 which are respectively associated with the extended buses 101 to 103 are received independently of each other, they may conflict on the D-channel signal bus 130. In this instance, the conflict control circuit 50 performs conflict control for allowing one of the D-channel signal transfer control circuits 30 to 32 to feed a frame signal on its associated D channel 114, 117 or 120 to the D channel signal bus 130. The other transfer control signals excluded from the D-channel signal bus 130 by such conflict control individually store the frame signals and, when allowed to use the bus 130 afterwards, deliver them to the bus 130.

The NT-side D-channel signal transfer control circuit 33 side repeats the frame signal coming in over the D-channel signal bus 130 and sends it to the layer 1 terminal circuit 10 at a rate of 16 kilobits per second. In response, the layer 1 terminal circuit 10 multiplexes two B-channel signals fed over the B1 channel 110 and B2 channel 111 and the single D-channel signal fed over the D channel 121, the resulting signal being fed out to the NT-side output bus 100. At this time, the signal format defined in CCITT Rec. I.430 (Rec. I.441, point S) is adopted.

In response to a layer 1 activate request from the NT side, the layer 1 terminal circuit 10 detects a bit A shown in CCITT Rec. I.430, FIG. 3/I.430 and sends a layer 1 control signal 140 to the layer 1 activation control circuit 80 to drive the latter. This causes the layer 1 terminal circuits 11, 12 and 13 to turn the bit A on the TE side (CCITT Red. I.430, FIG. 3/I.430) to a ONE, whereby the layer 1 of all of the TEs is activated. Likewise, in response to a layer 1 activate request from the TE side, any of the layer terminal circuits 11, 12 and 13 detects the bit A as shown in CCITT Rec. I.430, FIG. 3/I.430 so that the layer 1 activation control circuit 80 drives all of the layer 1 terminal circuits and, as a result, the bit A shown in FIG. 3/I.430 is activated in the layer 1 of all of the TEs and the NT. In this manner, an activate signal is interchanged between the NT and the TEs.

Concerning the B channels, the B-channel switching circuit 20 couples the two B-channel signals 110 and 111 (64 kilobits per second) to only two of the number of B channels 112, 113, 115, 116, 118 and 119 on the TE side. Which two of the B channels should be selected is determined by the D-channel signal monitoring circuit 60. More specifically, the D-channel signal monitoring circuit 60 monitors a control signal frame included in the frames on the D channels 114, 117, 120 and 121 which are propagated through the adapter 1, particularly a SETUP signal and CONNect signals as defined in Rec. I.450(Q.930) and I.451(Q.931). By monitoring a SETUP signal upon the arrival of a call, it is possible to see on which of the two B channels 110 and 111 on the NT side the call is to be received. Also, by determining which of CONNect signals, i.e., responses to the SETUP signal received over the extended buses 101 to 103 has been returned to the NT side first, which of the extended buses 101 to 103 should have its B channels connected to the B channels on the NT side (see CCITT Rec. I.451, FIG. 37/I.451) is known. In this manner, the B-channel switching circuit 20 is controlled to connect the NT-side B1 channel 110 and any of the TE-side B1 channels 112, 115 and 118 and to connect the NT-side B2 channel 111 and any of the TE-side B2 channels 113, 116 and 119.

When a reception control function is additionally provided, the adapter 1 will be operated as follows. Upon the arrival of a call from a network, a SETUP message as prescribed by CCITT Rec. I.450(Q.930) and I.451(Q.931) is sent over the D channel 121 to the D-channel signal transfer control circuit 33 via the S/T interface 100. Examining the content of the SETUP message, the D-channel signal transfer control circuit 33 decides whether or not to deliver the SETUP message to the extended buses 101 to 103 according to a decision algorithm selected beforehand by the subscriber, delivering the SETUP message on the basis of the result of such a decision. Hence, any call which does not agree with the algorithm is prevented from arriving at the extended buses.

Examples of the content of SETUP message applicable to the decision algorithm are as follows:

(1) Reception by Global Address

Global Address generally refers to reception of the kind in which a terminal to receive a call is not designated by a subscriber number (in the case of Multiple Subscriber Number Service) or by a subaddress. In this case, a call is prevented from arriving at designated extended buses; and (2) Reception by teleservice Any TEs 602 to 608 may be connected to the extended buses 101 to 103 via connectors 303 to 309, respectively. When it is desired to allow only CCITT G4FAX calls to be received on the extended buses while inhibiting the other kinds of calls such as telephone calls, the decision algorithm may be such that only a call with a SETUP message in which a command "G4FAX" by teleservice is included in the high layer compatibility field is gated while the other SETUP messages are blocked and discarded.

Various modifications will become possible for those skilled in the art after receiving the teachings of the present disclosure without departing from the scope thereof.

What is claimed is:

1. An ISDN (Integrated Services Digital Network) terminal multiplexing simple adapter for an ISDN basic subscriber access system, comprising:

a network termination (NT)-side layer 1 terminal circuit connected to an NT via an S interface bus;

a plurality of ISDN terminal equipment (TE)-side layer 1 terminal circuits for terminating a plurality of S interface buses to which ISDN TEs are connected;

a layer 1 activation control circuit for delivering an activation command to said NT-side layer 1 terminal circuit and all of said TE-side layer 1 terminal circuits in response to S interface bus activation information which may be fed from said NT-side layer 1 terminal circuit and said TE-side layer 1 terminal circuits;

an NT-side D-channel signal transfer control circuit for buffering and controlling transmission and reception of a D-channel signal which is separated by said NT-side layer 1 terminal circuit;

TE-side D-channel signal transfer control circuits each being associated with a respective one of said layer 1 terminal circuits for buffering and controlling transmission and reception of a D-channel signal which is separated by said TE-side layer 1 terminal circuit;

a conflict control circuit for controlling conflicts of data which may be transferred from said TE-side D-channel signal transfer control circuits to said NT-side D-channel signal transfer control circuit;

data transfer means for transferring data from said NT-side D-channel signal transfer control circuit to said TE-side D-channel signal transfer control circuits by a broadcast mode;

a B-channel switching circuit for selectively connecting B channels of said NT-side layer 1 terminal circuit and B channels of said TE-side layer 1 terminal circuits;

a monitoring circuit for monitoring the D-channel signal which is separated by said NT-side layer 1 terminal circuit; and a B-channel switching control circuit for controlling said B-channel switching circuit in response to a call control signal which is sensed by said monitoring circuit.

2. An ISDN (Integrated Services Digital Network) terminal multiplexing simple adapter for an ISDN basic subscriber access system, comprising:

a network termination (NT)-side layer 1 terminal circuit connected to an NT via an S interface bus;

a plurality of ISDN terminal equipment (TE)-side layer 1 terminal circuits for terminating a plurality of S interface buses to which ISDN TEs are connected;

a layer 1 activation control circuit for delivering an activation command to said NT-side layer 1 terminal circuit and all of said TE-side layer 1 terminal circuits in response to S interface bus activation information which may be fed from said NT-side layer 1 terminal circuit and said TE-side layer 1 terminal circuits;

an NT-side D-channel signal transfer control circuit for buffering and controlling transmission and reception of a D-channel signal which is separated by said NT-side layer 1 terminal circuit;

TE-side D-channel signal transfer control circuits each being associated with a respective one of said layer 1 terminal circuits for buffering and controlling transmission and reception of a D-channel signal which is separated by said TE-side layer 1 terminal circuit;

a conflict control circuit for controlling conflicts of data which may be transferred from said TE-side D-channel signal transfer control circuits to said NT-side D-channel signal transfer control circuit;

data transfer means for transferring data from said NT-side D-channel signal transfer control circuit to said TE-side D-channel signal transfer control circuits in a broadcast mode;

a reception control circuit for designating a particular one of said TE-side S interface buses in response to a call received from an Integrated Services Digital Network and data setting means for setting data in said reception control circuit;

data transfer means for identifying, among data transferred from said NT-side D-channel signal transfer control circuit to said TE-side D-channel signal transfer control circuits, a SETUP message from said Integrated Services Digital Network and transferring data only to any of said TE-side D-channel signal transfer control circuits which is allowed by said reception control circuit;

a B-channel switching circuit for selectively connecting B-channels of said NT-side layer 1 terminal circuit and B-channels of said TE-side layer 1 terminal circuits;

a monitoring circuit for monitoring the D-channel signal which is separated by said NT-side layer 1 terminal circuit; and a B-channel switching control circuit for controlling said B-channel switching circuit in response to a call control signal which is sensed by said monitoring circuit.

* * * * *